Figure 3:
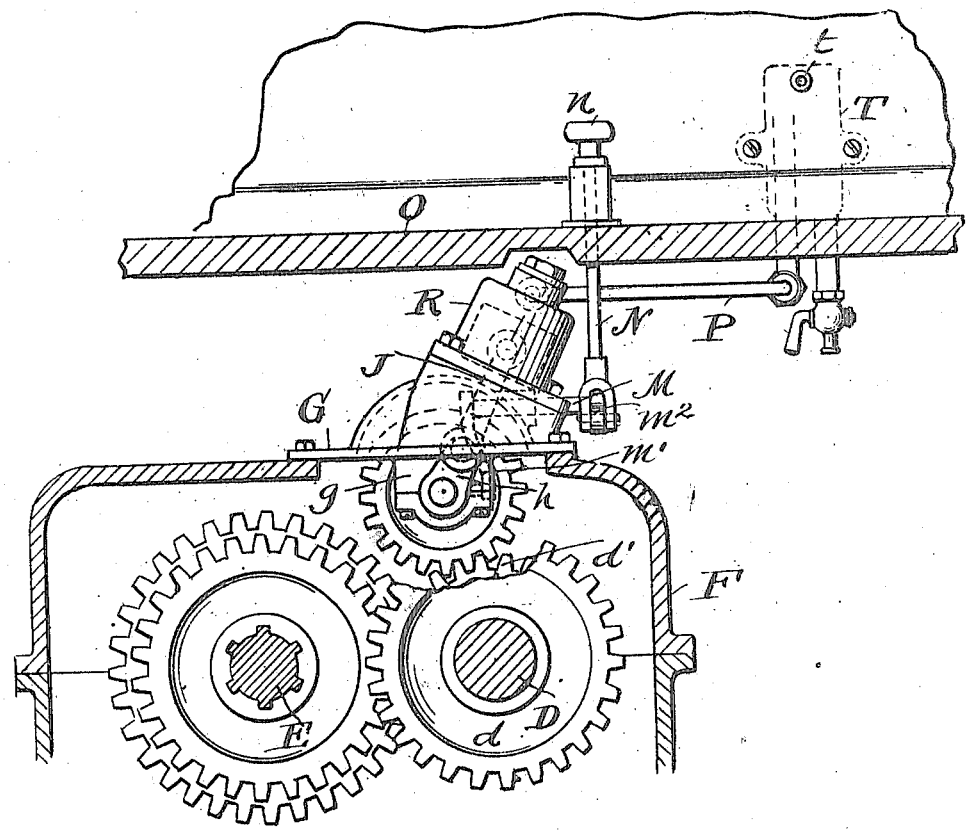

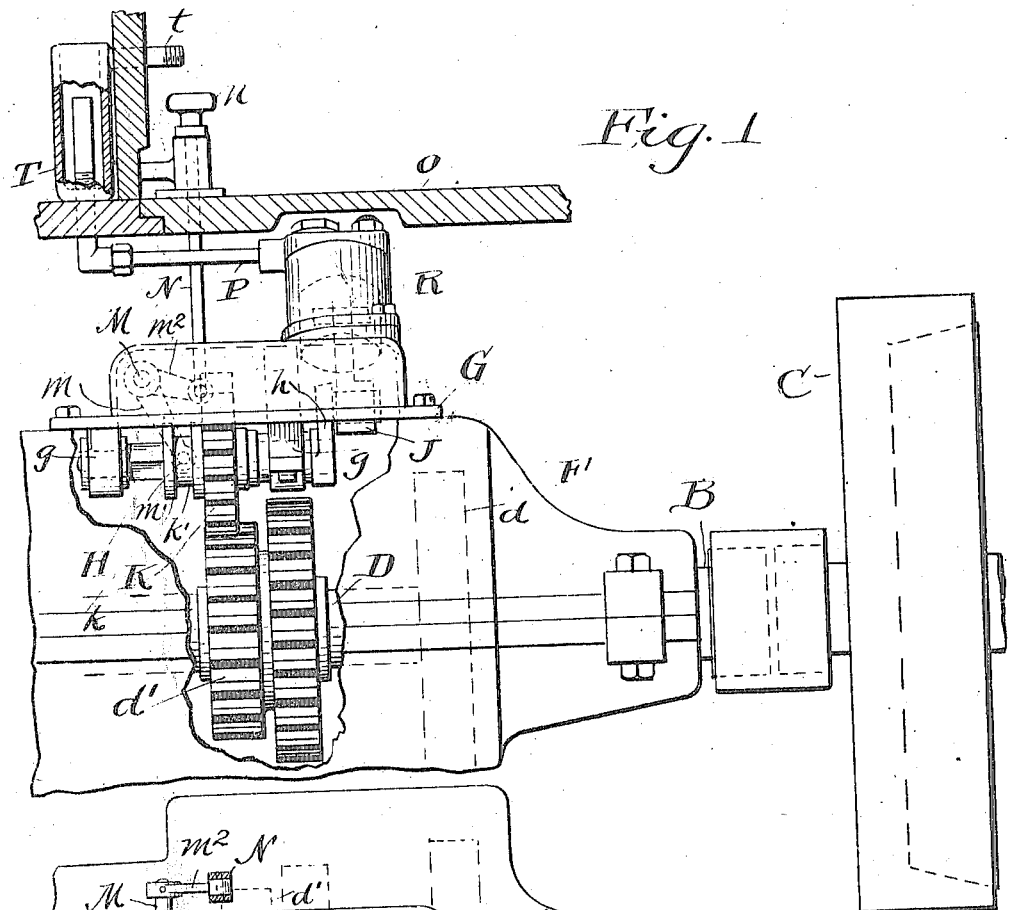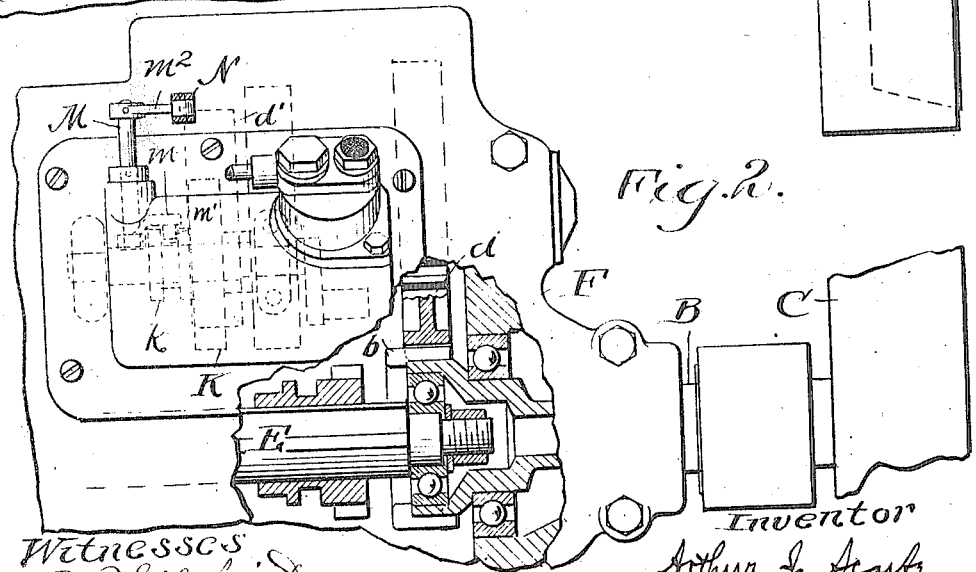

A. J. SCAIFE.
AIR PUMP ATTACHMENT FOR AUTOMOBILES.
APPLICATION FILED JUNE 9, 1913.

1,190,804. Patented July 11, 1916.

UNITED STATES PATENT OFFICE.

ARTHUR J. SCAIFE, OF CLEVELAND, OHIO, ASSIGNOR TO THE WHITE COMPANY, OF CLEVELAND, OHIO, A CORPORATION OF OHIO.

AIR-PUMP ATTACHMENT FOR AUTOMOBILES.

1,190,804.

Specification of Letters Patent.  Patented July 11, 1916.

Application filed June 9, 1913.  Serial No. 772,470.

*To all whom it may concern:*

Be it known that I, ARTHUR J. SCAIFE, a citizen of the United States, residing at Cleveland, in the county of Cuyahoga and state of Ohio, have invented a certain new and useful Improvement in Air-Pump Attachments for Automobiles, of which the following is a full, clear, and exact description.

The object of this invention is to provide an air pump and associated parts which may be easily applied to many different varieties of motor cars, in such relation to the power transmitting mechanism that the pump may be operated whenever desired, by power derived from the same motor which drives the car.

The invention consists in the construction and combination of parts shown in the drawing, and hereinafter described and pointed out definitely in the appended claims.

The drawing shows the invention applied to a motor car which has change speed gearing of the sort that includes a counter shaft which is always geared to the transmission driving shaft and which therefore always turns when the clutch is set to connect the transmission driving shaft with the motor shaft.

In the drawing, Figure 1 is a side elevation, partly broken away and sectioned, of so much of a motor car to which this invention is applied as is necessary to show the invention and the manner of its application. Fig. 2 is a plan view partly broken away of a part of the transmission gear case and the invention applied thereto; and Fig. 3 is a transverse sectional view through said transmission gear case and adjacent parts showing the invention and its relation to said parts.

Referring to the parts by letters, A represents the rear end of the motor shaft, and B the alined driving shaft of the transmission gearing, which latter shaft projects into the transmission case F through the front wall thereof, and is mounted in suitable bearings in said case.

C represents a clutch by means of which the motor shaft A and the driving shaft B may be connected or disconnected at will.

The driven shaft E of the transmission gearing is alined with the driving shaft B; and is mounted in bearings in the case. The counter shaft D is also mounted in bearings in the case F, and is parallel with the other shafts. Two gears $b$ and $d$ are fixed respectively to driving shaft B and counter shaft D, and are always in mesh. Wherefore the counter shaft will always rotate when the driving shaft is rotated. Through intermeshable gears,—some sliding and some fixed,—carried by the counter-shaft and the driven shaft E, the latter will be driven by the former at various relative speeds.

All of the foregoing is old, and is typical of a large proportion of the motor cars now in use. It is to be understood, however, that there is quite a wide variation in the specific construction and arrangement of the parts specified, in different motor cars on the market; and that therefore it is not the intention to limit this invention to the specific old mechanism shown and described, because said invention, either in the precise form shown or in some easily produced modification thereof, may be employed with various other specific varieties of the old mechanism referred to.

C represents the removable cover plate of the transmission gear case. There are depending brackets $g$ on the under side of this cover plate; and in these is mounted a shaft H, which shaft, when the cover plate is secured upon the case, will lie above and be parallel to the counter shaft D, of the transmission gearing. An air pump R of any suitable construction is fixed to this cover plate and projects above the same. The pump may be of any suitable specific construction. The connecting rod J thereof, which may have the usual connection with the usual piston, is also connected with a crank $h$ on the end of the shaft H. On a squared part of shaft H is a sliding gear K,—which is arranged adjacent to one of the gears, as, for example, gear $d^1$ fixed to the counter shaft F and it is of such size that it may be moved along shaft H into and out of mesh with said gear $d$. The gear K is provided with a sleeve $k$, in which is a circumferential groove $k^1$. A rock shaft M is mounted in bearings on the cover plate and has on the under side of the cover an arm $m$ carrying a pin $m^1$ which engages in this groove $k^1$. The other end of this rock shaft M projects from its bearings outside of the cover and has an arm $m^2$ attached to it. To this arm is connected an operating link N, which, in the construction shown, extends upward through the floor O just in front of the heel board; and has an operating knob n secured to its upper end, so as to be easily operable by the driver.

A pipe P which may lead to any desired point is connected with the discharge port of the air pump. In the construction shown this pipe leads to a combined oil strainer and pressure chamber T fixed to the rear side of the foot board beneath the hood. This discharge nozzle t leading from the upper end of this air chamber extends forward through the heel board and is shaped so that a flexible hose may be connected to it. The cock $t^1$ is to enable one to drain off the oil which may accumulate in said chamber.

In order that the pump may be operated, the driver has only to so move the operating knob n that through the described mechanism the gear K will be slipped into mesh with gear d on the counter shaft. Then, when the clutch C is set and the motor shaft is turned, this pump will operate irrespective of whether or not the transmission gearing is in mesh so as to drive the driven shaft of the transmission gearing.

It is apparent that the described mechanism in which the invention is embodied may be easily applied to almost any motor car by merely removing the ordinary cover plate and by substituting a cover plate carrying air pump and associated mechanism above described.

Having thus described my invention, I claim:

1. In combination with the transmission gear case of a motor car, and transmission gearing therein, of a cover plate removably secured to said gear case, an air pump fixed to said cover plate, a pump-operating shaft mounted on the under side of said cover plate, pump operating mechanism driven by said pump operating shaft, and means for bringing about at will a driving connection between the pump operating shaft and some part of the transmission gearing with said gear case.

2. In combination with the transmission gear case of a motor car, the transmission gear counter shaft mounted in said gear case, and a gear on said countershaft, of a removable cover plate to said gear case, an air pump fixed to said cover plate, a pump operating shaft mounted on the under side of said cover plate in parallel relation to said counter shaft, pump operating mechanism driven by said pump operating shaft, a sliding gear on the pump operating shaft, and means for moving said gear into and out of mesh with the gear on the counter shaft.

3. In combination with the transmission gear case of a motor car, the transmission gear counter-shaft mounted in said gear case, and a gear on said counter-shaft, of a removable cover plate to said gear case, an air pump fixed to said cover plate, a pump operating shaft mounted on the under side of said cover plate in parallel relation to said counter shaft, pump operating mechanism driven by said pump operating shaft, a sliding gear on the pump operating shaft, and means for moving said gear into and out of mesh with the gear on the counter shaft, a rock shaft mounted on said cover plate having an arm which projects into the gear case for operating the sliding gear on the pump shaft, and having another arm which projects above the cover plate, an operating link which extends from the last mentioned arm to a convenient operating point.

In testimony whereof, I hereunto affix my signature in the presence of two witnesses.

ARTHUR J. SCAIFE.

Witnesses:
A. J. HUDSON,
L. I. PORTER.